United States Patent
Laaksonen et al.

(10) Patent No.: US 10,993,066 B2
(45) Date of Patent: Apr. 27, 2021

(54) APPARATUS AND ASSOCIATED METHODS FOR PRESENTATION OF FIRST AND SECOND VIRTUAL-OR-AUGMENTED REALITY CONTENT

(71) Applicant: Nokia Technologies Oy, Espoo (FI)

(72) Inventors: Lasse Laaksonen, Tampere (FI); Arto Lehtiniemi, Lempäälä (FI); Antti Eronen, Tampere (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/438,687

(22) Filed: Jun. 12, 2019

(65) Prior Publication Data

US 2019/0394607 A1 Dec. 26, 2019

(30) Foreign Application Priority Data

Jun. 20, 2018 (EP) .................................... 18178674

(51) Int. Cl.
*H04S 7/00* (2006.01)
*G06F 3/16* (2006.01)
*H04R 5/04* (2006.01)

(52) U.S. Cl.
CPC .............. *H04S 7/304* (2013.01); *G06F 3/165* (2013.01); *H04R 5/04* (2013.01); *H04S 2400/11* (2013.01); *H04S 2400/13* (2013.01); *H04S 2420/01* (2013.01)

(58) Field of Classification Search
USPC ....... 381/73.1, 71.9, 92, 163, 313, 356, 387, 381/310
See application file for complete search history.

(56) References Cited

U.S. PATENT DOCUMENTS

| | | | |
|---|---|---|---|
| 2016/0269712 A1* | 9/2016 | Ostrover | H04S 7/301 |
| 2017/0068508 A1 | 3/2017 | Cricri et al. | |
| 2018/0020312 A1* | 1/2018 | Visser | G06F 3/017 |

OTHER PUBLICATIONS

Extended European Search Report received for corresponding European Patent Application No. 18178674.0, dated Nov. 12, 2018, 7 pages.
Office Action for European Application No. 18178674.0, dated Dec. 4, 2020, 7 pages.

* cited by examiner

*Primary Examiner* — Yosef K Laekemariam
(74) *Attorney, Agent, or Firm* — Alston & Bird LLP

(57) ABSTRACT

An apparatus comprising means configured to: receive first information indicative of a reference location; provide for presentation of audio content as spatial audio to be perceived, from the reference location, as originating from a direction of at least one virtual audio source, the at least one virtual audio source associated with a real-world location; receive second information indicative of at least the presence of a real-world object between the real-world location of the at least one virtual audio source and the reference location; modify, based on the second information, the audio content to indicate aurally the location of the real-world object; and provide for presentation of the modified audio content as spatial audio.

18 Claims, 5 Drawing Sheets

APPARATUS AND ASSOCIATED METHODS FOR PRESENTATION OF FIRST AND SECOND VIRTUAL-OR-AUGMENTED REALITY CONTENT

TECHNICAL FIELD

The present disclosure relates to the field of presentation of virtual, augmented and mixed reality. In particular, it is related to the presentation of a hybrid virtual space based on at least first and second virtual-or-augmented reality content, associated apparatus, methods and computer programs.

BACKGROUND

The presentation of virtual reality environments is becoming common, with content creators providing more and more content for exploration. The virtual reality experience may be enhanced by communication between users who may be experiencing different virtual reality content. However, providing for an effective communication interface between users who are presented with immersive virtual reality content may be difficult.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus, the apparatus comprising means configured to:
  receive first information indicative of a reference location;
  provide for presentation of audio content as spatial audio to be perceived, from the reference location, as originating from a direction of at least one virtual audio source, the at least one virtual audio source associated with a real-world location;
  receive second information indicative of at least the presence of a real-world object between the real-world location of the at least one virtual audio source and the reference location;
  modify, based on the second information, the audio content to indicate aurally the location of the real-world object; and
  provide for presentation of the modified audio content as spatial audio.

In one or more examples, the audio content comprises part of one of augmented reality content and virtual reality content and wherein the presentation of the audio content and modified audio content includes the presentation of visual imagery for the user as one of said augmented reality and said virtual reality. In one or more examples, the audio content and/or modified audio content is presented by one of headphones and loudspeakers. In one or more examples, the location of the at least one virtual audio source is not co-located with the at least one of headphones and loudspeakers. In one or more examples, the or each virtual audio source has assigned thereto a respective real-world location from which a user, when presented with the audio content when the apparatus is in use, will perceive the audio content to originate, and wherein the reference location comprises the location of said user.

In one or more examples, the means are configured to modify the audio content by one or more of:
  i) providing a temporary reduction in volume;
  ii) providing for a temporary change in the level of reverberation;
  iii) providing for a temporary change in aural presentation and maintaining the direction of the virtual audio source.

In one or more examples, the means are configured to:
  receive user-input; and
  reposition, based on said user-input, one or more of the at least one virtual audio sources to thereby define a region between the reference location and the one or more virtual audio sources in which the presence of the real-world object will cause the modifying of the audio content.

In one or more examples, the second information is indicative of at least the presence or absence of a real-world object within a predetermined distance of a line connecting the location of each of the at least one virtual audio sources and the reference location.

In one or more examples, the at least one virtual audio source comprises a plurality of said virtual audio sources each having an assigned respective real-world location, and wherein said second information is configured to be indicative of at least the presence or absence of a real-world object between any one or more of the plurality of virtual audio sources and the reference location; and wherein
  said means are configured to individually select, based on the second information, those of the plurality of virtual audio sources having the real-world object located between them and the reference location, such that said modification of the audio content is applied to the audio content presented as originating from the selected virtual audio sources and not applied to the audio content presented as originating from the virtual audio sources that do not comprise the selected virtual audio sources.

In one or more examples, the number of virtual audio sources is user controllable based on user input.

In one or more examples, the modification of the audio content comprises the means being configured to apply an audio modifying effect to the presentation of the audio content to provide said modified audio content.

In one or more examples, the second information is based on information indicative of the real-world location assigned of the or each virtual audio source, and visual tracking of objects using one or more cameras to determine their location relative to the virtual audio sources and the reference location.

In one or more examples, the means are configured to determine the second information based on sensor data indicative of location of real world objects relative to the user.

In one or more examples, the means are configured to provide for positioning of the location of the virtual audio sources beyond walls of a room in which the reference location is located and the second information is indicative of the presence or absence of a real-world object between the reference location and the location of the at least one virtual audio source.

In one or more examples, the audio content includes live audio captured from a space in which the reference location is located.

In one or more examples, the second information is further indicative of the real-world object being one of a first predetermined classification and a second predetermined classification, and wherein the modification of the audio content comprises a first audio modification for real-world objects of the first predetermined classification and a second, different, audio modification for real-world objects of the second predetermined classification.

In one or more examples, the first and second predetermined classifications are based on one or more of:
the physical size of the real-world object;
the current speed of movement of the real-world object;
the real-world object comprising a child or an adult; and
a user-specified criterion.

In one or more examples, presentation as spatial audio is based on the direction of the virtual audio source relative to reference location and is independent of the distance between the virtual audio source and the reference location.

In one or more examples, the audio content comprises at least a first audio content and a second audio content, the first and second audio content comprising different audio content, and the at least one virtual audio source comprises a plurality of virtual audio sources, and
wherein the means are configured to present the first audio content to be perceived as originating from a first subset of the plurality of the virtual audio sources and to present the second audio content to be perceived as originating from a second, different subset of the plurality of the virtual audio sources.

In one or more examples, the means are configured to assign the location of the one or more virtual audio sources relative to a space within which the user is located when said user consumes said presented audio content.

In a further aspect there is provided a method, the method comprising:
receiving first information indicative of a reference location;
providing for presentation of audio content as spatial audio to be perceived, from the reference location, as originating from a direction of at least one virtual audio source, the at least one virtual audio source associated with a real-world location;
receiving second information indicative of at least the presence of a real-world object between the real-world location of the at least one virtual audio source and the reference location;
modifying, based on the second information, the audio content to indicate aurally the location of the real-world object; and
providing for presentation of the modified audio content as spatial audio.

In a further aspect there is provided a computer readable medium comprising computer program code stored thereon, the computer readable medium and computer program code being configured to, when run on at least one processor, perform the method of:
receiving first information indicative of a reference location;
providing for presentation of audio content as spatial audio to be perceived, from the reference location, as originating from a direction of at least one virtual audio source, the at least one virtual audio source associated with a real-world location;
receiving second information indicative of at least the presence of a real-world object between the real-world location of the at least one virtual audio source and the reference location;
modifying, based on the second information, the audio content to indicate aurally the location of the real-world object; and
providing for presentation of the modified audio content as spatial audio.

In a further aspect there is provided an apparatus, the apparatus comprising at least one processor; and
at least one memory including computer program code, the at least one memory and the computer program code configured to, with the at least one processor, cause the apparatus to perform at least the following:
receive first information indicative of a reference location;
provide for presentation of audio content as spatial audio to be perceived, from the reference location, as originating from a direction of at least one virtual audio source, the at least one virtual audio source associated with a real-world location;
receive second information indicative of at least the presence of a real-world object between the real-world location of the at least one virtual audio source and the reference location;
modify, based on the second information, the audio content to indicate aurally the location of the real-world object; and
provide for presentation of the modified audio content as spatial audio.

The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
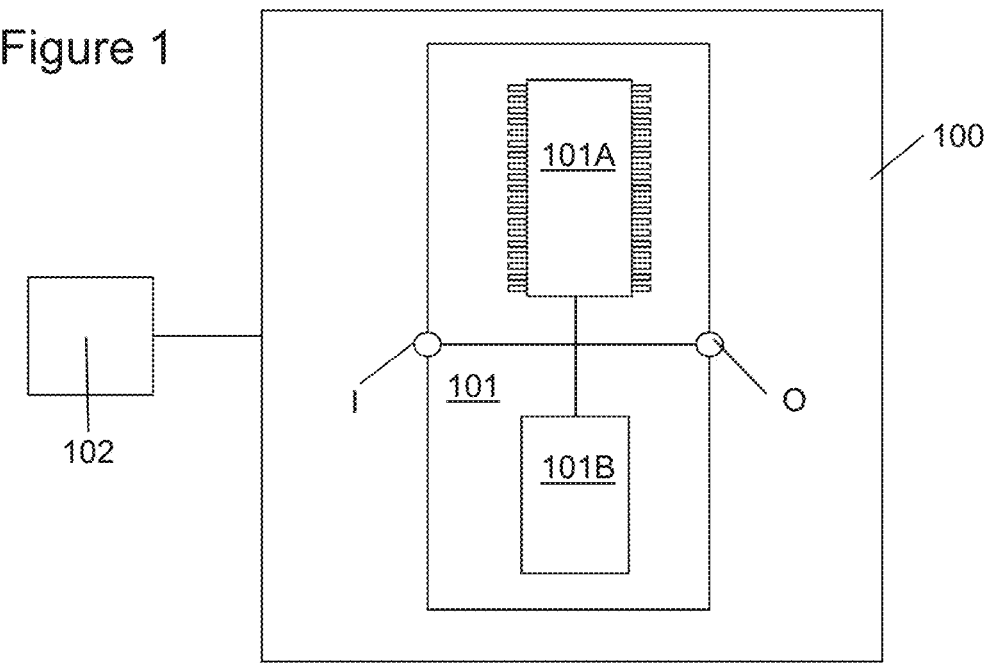
FIG. 1 illustrates an example apparatus for providing for presentation of audio content.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real-world scene to simulate the user being physically present at a real world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view). A panoramic video may have a wide field of view in that it has a spatial extent greater than a field of view of a user or greater than a field of view with which the panoramic video is intended to be displayed. One or more examples herein may relate to the provision of virtual reality.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and, optionally, one or more (e.g. directional) microphones configured to capture the surrounding visual and aural scene from a capture point of view. In some examples, the VR content capture device comprises multiple, physically separate cameras and/or microphones. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present. One or more examples herein may relate to the provision of virtual reality based on virtual reality content.

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world. One or more examples herein may relate to the provision of augmented reality.

The virtual reality content may comprise, and a VR apparatus presenting said VR content may provide, pre-defined-viewing-location VR or free-viewing-location VR. In predefined-viewing-location VR, the location of the user in the virtual reality space may be fixed or follow a pre-defined path. Accordingly, a user may be free to change their viewing direction with respect to the virtual reality imagery provided for display around them in the virtual reality space, but they may not be free to arbitrarily change their viewing location in the VR space to explore the VR space. Thus, the user may experience such VR content from a fixed point of view or viewing location (or a limited number of locations based on where the VR content capture devices were located in the scene). In some examples of predefined-viewing-location VR the imagery may be considered to move past them. In predefined-viewing-location VR content captured of the real world, the user may be provided with the point of view of the VR content capture device. Predefined-viewing-location VR content may provide the user with three degrees of freedom in the VR space comprising rotation of the viewing direction around any one of x, y and z axes and may therefore be known as three degrees of freedom VR (3DoF VR). The location of the content presented to the user may be considered to be defined relative to the user's body, rather than their head.

In free-viewing-location VR, the VR content and VR apparatus presenting said VR content may enable a user to be free to explore the virtual reality space. Thus, the VR apparatus may allow for the user to be provided with a free point of view or viewing location in the virtual reality space along with a free viewing direction. Free-viewing-location VR is also known as six degrees of freedom (6DoF) VR or volumetric VR to those skilled in the art. Thus, in 6DoF VR the user may be free to look in different directions around the VR space by modification of their viewing direction and also free to change their viewing location (their virtual location) in the VR space by translation along any one of orthogonal x, y and z axes. The movement available in a 6DoF virtual reality space may be divided into two categories: rotational and translational movement (with three degrees of freedom each). Rotational movement enables a user to turn their head to change their viewing direction. The three rotational movements are around x-axis (roll), around y-axis (pitch), and around z-axis (yaw). Translational movement means that the user may also change their point of view in the space to view the VR space from a different virtual location, i.e., move along the x, y, and z axes according to their wishes. The translational movements may be referred to as surge (x), sway (y), and heave (z) using the terms derived from ship motions.

Mixed reality is similar to augmented and virtual reality and includes the use of a three-dimensional model of the real-world environment to enable virtual objects, including visual and audio objects, to appear to interact with real-world objects in terms of one or more of their movement, presentation (e.g. audible presentation) and appearance. Mixed reality may be considered as a subset of virtual reality and a subset of augmented reality.

One or more examples described herein relate to 3DoF virtual, mixed or augmented reality content or 6DoF virtual, mixed or augmented reality content in which the user is at least substantially free to move in the virtual space by user-input through physically moving or, for example, via a dedicated user interface (UI).

Spatial audio comprises audio presented in such a way to a user that it is perceived to originate from a particular location, as if the source of the audio was located at that particular location. Spatial audio content comprises audio for presentation as spatial audio and, as such, typically comprises audio having directional information (either explicitly specified as, for example, metadata or inherently present in the way the audio is captured), such that the spatial audio content can be presented such that its component audio is perceived to originate from one or more points or one or more directions in accordance with the directional information.

Thus, virtual reality content may be provided with spatial audio having directional properties, such that the audio is perceived to originate from a point in the VR space, which may be linked to the imagery of the VR content. Augmented or mixed reality content may be provided with spatial audio, such that the spatial audio is perceived as originating from real world objects visible to the user and/or from augmented reality graphics overlaid over the user's view.

Spatial audio may be presented independently of visual virtual reality or visual augmented reality content. Nevertheless, spatial audio, in some examples, may be considered to be augmented reality content because it augments the aural scene perceived by a user. As an example of independent presentation of spatial audio, a user may wear headphones and, as they explore the real world, they may be presented with spatial audio such that the audio appears to originate at particular locations associated with real world objects or locations. For example, a city tour could be provided by a device that tracks the location of the user in the city and presents audio describing points of interest as spatial audio such that the audio is perceived to originate from the point of interest around the user's location. One or more of the embodiments described herein may present spatial audio.

In one or more examples, non-spatial audio content may be presented as spatial audio. Thus, "conventional" monophonic or stereophonic audio (or audio converted to such a format) may be provided for presentation such that it will be perceived to originate from a particular location or direction. One or more of the embodiments described herein may present spatial audio based on spatial audio content or non-spatial audio content.

The spatial positioning of the spatial audio content may be provided by binaural rendering and 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonic audio presentation may be used to present spatial audio.

Spatial audio may use one or more of volume differences, timing differences and pitch differences between audible presentation to each of a user's ears to create the perception that the origin of the audio is at a particular location or in a particular direction in space. The perceived distance to the perceived origin of the audio may be rendered by controlling the amount of reverberation and gain to indicate closeness or distance from the perceived source of the spatial audio. It will be appreciated that spatial audio presentation as described herein may relate to the presentation of audio with only a perceived direction towards its origin as well as the presentation of audio such that the origin of the audio has a perceived location, e.g. including a perception of distance from the user.

The presentation of virtual reality, augmented reality or mixed reality may create an immersive experience for the user making it more difficult for them to notice what is occurring or changing in the real-world space around them. The presentation of spatial audio, particularly using headphones, also creates an immersive experience for the user making it more difficult for them to notice what is occurring or changing in the real-world space around them. The headphones themselves may prevent a user from hearing people or objects who move or are moved into the vicinity of the user, particularly when those people or objects are out of view or perhaps blocked from view by virtual reality content or augmented reality content.

For example, if we consider changes in the real environment, e.g., another person appearing in the space who wishes to talk to the user, it may be difficult or even impossible for the user to observe or notice such changes. In case of audio-only AR/VR presentation, the user may at least notice changes that are visible to them, but in full-VR audio-visual presentation the user's vision is blocked.

FIG. 1 shows an example system 100 configured to provide for presentation of audio content to a user, such as via headphones or loudspeakers. The system 100 includes an example apparatus 101 for modification of audio content based on real-world space information, such as by modifying the presentation of the audio content. In one or more examples, the apparatus 101 provides the functionality of the system 100 in terms of the spatial audio presentation of the audio content to the user via the headphones.

The apparatus 101 may comprise or be connected to a processor 101A and a memory 101B and may be configured to execute computer program code. The apparatus 101 may have only one processor 101A and one memory 101B but it will be appreciated that other embodiments may utilise more than one processor and/or more than one memory (e.g. same or different processor/memory types). Further, the apparatus 101 may be an Application Specific Integrated Circuit (ASIC).

The processor may be a general-purpose processor dedicated to executing/processing information received from other components, such as from a real-world object sensor (not shown) and an audio content store (not shown), in accordance with instructions stored in the form of computer program code in the memory. The output signalling generated by such operations of the processor is provided onwards to further components, such as to a virtual reality, augmented reality, mixed reality or spatial audio presentation device, which may comprise part of the system 100. Headphones 200, intended to be worn by a user 201 (shown in example FIG. 2), may form part of the system 100.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

The apparatus 101, in this example, forms part of the system 100, which may comprise a spatial audio presentation device, that is a device configured for the presentation of audio content as spatial audio. In one or more examples, the apparatus 101 is the spatial audio presentation device, as mentioned above. In one or more other examples, the apparatus 101 may be separate from such a presentation device and may provide for its control. In other examples, the apparatus 101 may form part of one of a VR apparatus and an AR apparatus. In one or more examples, the apparatus 101 may be part of a mixed reality apparatus. In this example, the processor 101A and memory 101B is shared by the spatial audio presentation device 100 and the apparatus 101, but in other examples, they may have their own processors and/or memory.

In this and one or more examples, the spatial audio presentation device 100 or the spatial audio presentation device 100 under the control of the apparatus 101 may provide for aural presentation of audio content using the headphones 202. While this disclosure primarily describes embodiments in which the audio content is presented by headphones, it will be appreciated that the audio content may equally be presented by loudspeakers.

The apparatus 101 may receive first information indicative of a reference location. The reference location may comprise the location of the headphones 200 or the location of the user who is wearing the headphones, although the reference location could be any desired location. The first information may be provided to the apparatus from a location tracker 102. It will be appreciated that the first information could be provided to the apparatus 101 in any other way such as by manually entering where the user intends to sit or a centre of the room. In example embodiments in which the audio content is presented to the user by loudspeakers, it will be appreciated that the first information may be indicative of the user location rather than the location of the headphones. The location tracker 102 may comprises a single device or a plurality of sub devices that each perform one or more of the following functions: determine the user's location in the real-world space, determine the location of one or more real-world objects and determine second information. The user 201 or the headphones 200 may have one or more tags or markers on their person or attached thereto, which the tracker 102 may use to determine their location and, optionally, any other positional/movement/head orientation characteristic it is configured to determine. In other examples, the tracker 102 may use analysis of captured sensor data, such as visual data from a camera, to identify and recognise the user 201 and determine one or more of their location, body/head orientation or any other positional/movement characteristic it is configured to determine as well as the location of one or more real-world objects. It will be appreciated that such functionality may be provided by a plurality of independent apparatuses that are configured to report to the apparatus 101 or by the apparatus 101 itself based on sensor data, such as from the tracker 102.

Figure 2:
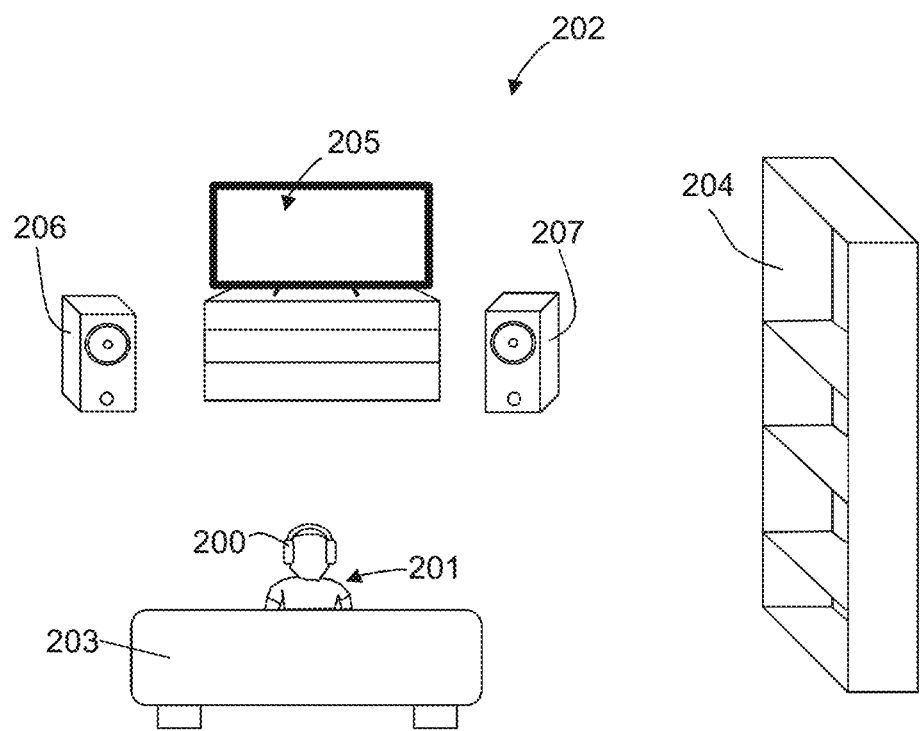
FIG. 2 shows an example space in which a user is listening to audio via headphones.

Example FIG. 2 shows the user 201 wearing headphones 200 in a space 202 comprising a room, such as their living room. The living room 202 comprises a sofa 203, bookcase 204, a TV 205 and speakers 206, 207. The user 201 may be experiencing audio content presented in an immersive way, such as by spatial audio presentation. The audio content may be from one or more audio sources and may thus comprise first audio content and second audio content and so on. The audio sources may provide audio in various formats, such as spatial audio, monophonic or stereophonic audio. The audio presentation device 100, such as under the control of the apparatus 101, may present the audio content as spatial audio. Accordingly, the audio content is presented in such a way, using the headphones 200 (or loudspeakers), that the audio content will be perceived (which may comprise first audio content and second audio content etc) as originating from one or more directions (or locations) in the space 202 around the user. The presentation of audio content as spatial audio can be considered to comprise the generation of one or more virtual audio sources, which comprise the location(s) from which the user 201 will perceive the audio content as originating. As described above, various audio presentation effects can be used to create the perception of the origin of the audio being at a specific location. Thus, a virtual audio source may be imagined as virtual loudspeaker located in the space 202. The apparatus 101 thus applies a set of one or more spatial audio effects to the audio content to create the perception of the position of the origin of the audio content.

Figure 3:
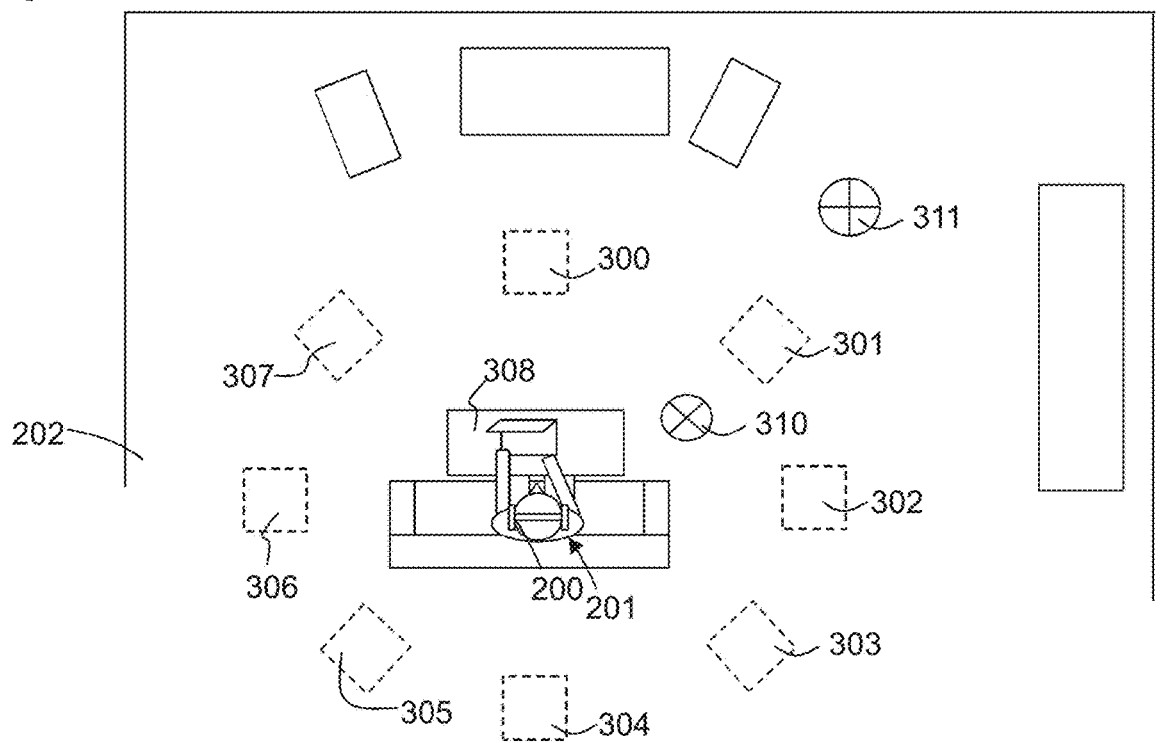
FIG. 3 shows the example space of FIG. 2 in plan view showing virtual audio sources at virtual locations defined relative to the space.

Example FIG. 3 shows the same space 202 as FIG. 2 but in plan view. In this example, the virtual audio sources 300-307 are shown. As mentioned above, the virtual audio sources have (or are assigned by the apparatus 101) a location or "virtual location" in the real-world space 202. As mentioned above, in one or more examples, the audio content is provided for presentation as spatial audio such that the user 201 will perceive the audio content as originating from a direction based on the location of each of the virtual audio sources 300-307 i.e. from the direction of the virtual audio source 300-307. In one or more examples, the distance of the virtual audio source from the headphones 200 or user 201 is ignored in the spatial audio rendering of the audio content and the spatial audio rendering is based on the direction towards the user from the location of the virtual audio source, such that the user 201 will perceive the audio from such a direction.

With reference to FIG. 3, the presentation device 100 or apparatus 101 may present the same audio content such that it is perceived to originate from the locations of each of the virtual audio sources 300-307 or, for brevity, such that it is heard from each of the virtual audio sources. In one or more other examples, the audio content comprises first audio content and second audio content and third audio content each comprising different audio, such as music, social media notifications and audio of a telephone call. The first audio content may be perceived from a first subset of the virtual audio sources, such as virtual audio sources 300, 301 and 302. The second audio content may be perceived from a second, different and possibly non-overlapping, subset of the virtual audio sources, such as virtual audio sources 303, 304 and 305. The third audio content may be perceived from a third subset of the virtual audio sources, different to the first and second subsets, such as virtual audio sources 306 and 307. In other examples, the subsets may comprise overlapping selections of the virtual audio sources. Thus, in summary, the apparatus 101 is configured to provide for presentation of at least audio content to headphones 200 (or loudspeakers) for a user 201, wherein said presentation comprises spatial audio presentation such that said audio content is to be perceived, by the user when the apparatus is in use, as originating from the direction of the one or more virtual audio sources 300-307. It will be appreciated that in one or more examples, the apparatus 101 may provide for such presentation or, in other examples, the apparatus 101 may be configured to present the audio content using the audio presentation device 100.

The apparatus 101 comprises means configured to provide for modification of the audio content to provide modified audio content. The apparatus further comprises means configured to provide for presentation of the modified audio content to be perceived from one or more of the at least one virtual audio sources based at least in part on second information. The apparatus 101 may be configured to receive, as input, second information, which in one or more examples may be determined by the apparatus 101, the second information indicative of at least the presence, or absence, of a real-world object 310, 311 between the reference location (e.g. the headphones 200 or user 201) and the virtual location of each respective virtual audio source 300-307. It will be appreciated that the second information may only include information about virtual audio sources that have the real-world object(s) between them and the reference location (e.g. headphones/user) and it can be assumed that the other virtual audio sources do not have a real-world object(s) between them and the headphones/user. In other examples, the second information may be indicative of only those virtual audio sources that do not have the real-world object(s) between them and the headphones/user and it can be assumed that the others do have the real-world object(s) between them and the headphones/user. In other examples, the second information is indicative of the presence and absence of the real-world object(s) for all of the virtual audio sources. The second information may be considered to be "real-world object information" because it is information about real-world objects being present or absent or located between the reference location, which is typically the user, and the virtual audio sources 300-307.

In this example, the second information would be indicative of the real-world object 310 being between the virtual audio source 301 and the user 201/headphones 200. The second information may be configured to indicate only moveable real-world objects, such as people, animals and objects that are moved by the aforementioned and motorised objects. In one or more examples, the presence or absence of a first and second real-world object 310, 311 between the headphones 200/user 201 and the virtual location of the or each virtual audio source 300-307 may be determined relative to an initialisation time, such that only changes since the initialisation time are considered. Accordingly, the table 308 in front of the user 201, while comprising a real-world object, would be ignored because it was present in its position at the initialisation time. If the table 308 were subsequently to move or be moved, then at least its presence between the user and one or more of the virtual audio sources may be indicated in the second information. The second real-world object 311 is not between any of the virtual audio sources and the headphones 200 or user 201 and therefore may not be part of the second information.

In one or more examples, the second information may include information to identify the presence/absence of real-world objects that may not be directly between any of the virtual audio sources but are within a predetermined distance thereof. For example, real-world objects within a predetermined distance of a line (e.g. line 404 in FIG. 4) connecting the virtual audio sources and the reference location (headphones 200/user 201) may be indicated in the second information. The apparatus 101 may be configured to cause the modification of the audio content and presentation of the modified audio content to the user based on such second information.

Thus, the apparatus 101 is configured to, based on the example spatial audio scene shown in FIG. 3 being presented and the receipt of the first information and the second information indicating that the real-world object 310 is between virtual audio source 301 and the reference location, provide for modification of the audio content and the presentation of the modified audio content. The modified audio content and presentation thereof may be provided to be perceived only from one or more selected virtual audio sources. The selected virtual audio sources may be selected based on them having the (or any other) real-word object 310 located between them and the reference location, as indicated in the second information. Thus, in this example, virtual audio source 301 is a selected virtual audio source but the virtual audio sources 300, 302-307 are not selected because they do not have a real-world object between them and the user 201/headphones 200. The apparatus 101 may be configured to provide for one or both of non-modification of the audio content or non-presentation of the modified audio content that is to be perceived from those virtual audio sources that do not comprise selected virtual audio sources. As the apparatus 101 is configured to provide for presentation of the modified audio content such that it is perceived to be from the virtual audio source 301 and may provide for presentation of non-modified audio content such that it is perceived to be from the virtual audio sources 300, 302-307, the apparatus 101 thereby aurally indicates, to the user 201, the location of (and thereby the presence of) the real-world object 310 as being in the direction of the virtual audio source 301. Thus, the apparatus 101 may determine which of the virtual sources 300, 302-307 from which the audio content should be perceived and which of the virtual audio sources 301 from which the modified audio content should be perceived based on the second information. The modification of the audio content and the presentation of the modified audio content may be provided by the apparatus applying an audio-modifying effect to the audio content when it is provided for presentation.

This may be advantageous in one or more examples as the user 201 is intuitively informed of the location of the first real-world-object 310 while enjoying the immersive audio content. In one or more examples, the type of modification of the audio content or the degree to which the audio content is modified may be based on how close to the headphones 200 or the user 201 the real-world object is located. Thus, the user 201 may be provided with an indication of the proximity of the real-world object.

In one or more examples, the closer that the real-world object 310 is to the user 201/reference location, the more virtual audio sources may be considered to be selected virtual audio sources as the real-world object may be considered to be between them and user 201. Accordingly, an indication of proximity may be provided by virtue of the number of virtual audio sources which present the modified audio content in a given sector around the user.

In one or more example, the apparatus 101 may be configured to provide for presentation of a user interface for the user 201 that shows where in the space 202 the virtual audio sources are located. Accordingly, when the user 201 hears the modified audio content being presented they have an understanding of where the real-world object must be to have caused the modification of the audio content and presentation of the modified audio content.

It will be appreciated that in one or more examples the audio content may comprises part of augmented reality content and therefore augmented reality graphics that are overlaid over the user's 201 view of the real-world may further limit their ability to appreciate real-world objects 310, 311 around them. In one or more examples, the audio content may comprise part of virtual reality content and therefore the user's view of the real-world may be obscured completely. The provision of the presentation of the modified audio content may optionally provide a convenient indication to the user without interruption or modification of the visual imagery of the VR/AR content provided for presentation to the user 201.

The modification of the audio content may provide for a change in the presentation of the audio content, from the selected virtual audio sources, relative to its normal presentation. The modification of the audio content may comprise an occlusion of the audio content from the direction of the virtual audio source 301 "blocked" by the real-world object 310. Accordingly, it may appear to the user 201 that the real-world object has blocked or partially blocked the audio from the direction of the selected virtual audio source 301. In one or more examples, the modified audio content comprises a non-zero volume modified version of the audio content. The modification of the audio content may be provided by causing a temporary reduction in volume, such as for the time the real-world object is between the virtual audio source 301 and the user 201/headphones 200. In one or more examples, the modification of the audio content may be provided by causing for a temporary change in the level of reverberation or echo. This may appear to the user 201 as if the real-world object 310 has blocked the line of sight path to the user and therefore the directly received audio content, but the reflections of the audio content may still be audible to the user 201. Thus, the modification of the audio content may change how the audio content sounds but may not change the location of the virtual audio source, such that the modified audio content is presented so that direction from which the user perceives the virtual audio source 301 is maintained despite the modification of the audio content.

In one or more examples, the audio content is modified for as long as the real-world object 310 is present between one or more of the virtual audio sources 300-307 and the user 201/headphones 200. Accordingly, if the real-world object 310 moves away beyond the virtual audio source 301 or to a location between a different virtual audio source 300-307 and the user 201/headphones 200, then the apparatus 101 may be configured to present the audio content in preference to the modified audio content perceived from virtual audio source 301 (and, optionally, not modify the audio content).

In one or more examples, the modified audio content is presented for a predetermined amount of time from when the real-world object 310 is (e.g. first) determined to be present between one or more of the virtual audio sources 300-307 and the user 201/headphones 200. Thus, if the real-world object 310 remains between the virtual audio source 301 for a period of time longer than the predetermined amount of time, the apparatus may stop presentation of the modified audio content and may present the un-modified audio content despite the presence of the object's 310. The apparatus 101 may be configured to, based on receipt of information indicating movement of the real-world object 310 from between the virtual audio source 301 and the user 201/headphones 200 prior to expiry of the predetermined amount of time, provide for presentation of the un-modified audio content instead of the modified audio content.

In one or more examples, the modification of the audio content and the presentation of the modified audio content is applied for as long as the real-world object 310 is moving or has moved within a recent predetermined time period. Thus, the presence of a person who has walked over and sat down next to the user 201 will cause the presentation of the modified audio content as they walk but once they are still, by virtue of having sat down, and perhaps are no longer a hazard to the user 201, the apparatus 101 may be configured to present the (un-modified) audio content.

As mentioned above, the second information may be provided to the apparatus 101 or determined thereby based on sensor data. In one or more examples, the second information may be determined based on the real-world object being in a location that intersects a line extending between the or each virtual audio source 300-307 and the headphones 200 and/or user 201. In one or more examples, the second information may be determined based on the real-world object 310 being within a region 400 (shown in FIG. 4) defined, at least in part, by a line 404 extending between the or each virtual audio source 300-307 and the headphones 200 and/or user 201. Thus, in one or more examples, the respective regions 400 may extend around the virtual audio sources and therefore a virtual audio source may be selected based on the real-world object being adjacent thereto in said region in addition to being between the virtual audio source and the user 201/headphones 200.

Figure 4:
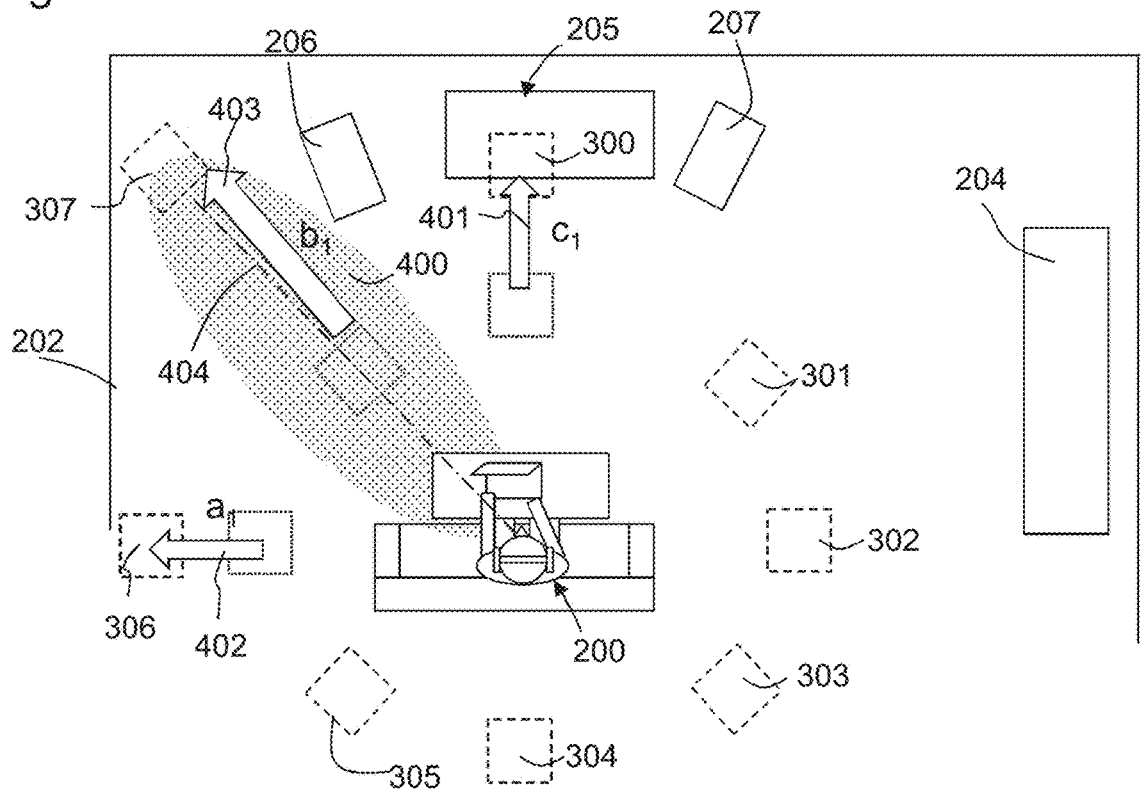
FIG. 4 shows the example space and the repositioning of the virtual audio sources based on user input.

Example FIG. 4 shows the same room or space 202 as FIG. 3. In FIG. 4, the position of some of the virtual audio sources 300-307 are moved. In one or more examples, the apparatus 101 may provide for control of the position of the virtual audio sources, which is used by the presentation device 100 in the presentation of spatial audio. In other examples, the apparatus 101 provides for said spatial audio presentation from said locations or new locations of the virtual audio sources.

The user 200 may wish to be aware of changes in the space 202 in front and to the left of them more than other parts of the space 200. Accordingly, in one or more examples, the apparatus 101 may be configured to provide for display of a user interface to receive user input comprising modification of one or more of the location of the virtual audio sources. Thus, the apparatus 101 may be configured to provide for (re-)positioning 401, 402, 403 of the virtual audio sources 300, 306 and 307 based on said user-input. The repositioning thus changes the length of the line 404 connecting the reference location/user/headphones and the respective virtual audio source. Accordingly, the region 400 is also redefined, between the headphones 200/user 201 and the one or more virtual audio sources 300, 306, 307, in which the presence of the real-world object will cause the presentation of the modified audio content to be perceived from the respective virtual audio source. It will be appreciated that the region 400 may be defined in ways other than with reference to a line connecting the virtual audio sources and the headphones/user. For example, the region 400, in other examples, may be an ellipse with the virtual audio source and the reference location comprising its foci.

In example FIG. 4, the virtual audio source 306 has been moved by distance a1 to the edge of the room; the virtual audio source 307 has been moved by distance $b_1$ to the edge of the room; and the virtual audio source 300 has been moved by distance $c_1$ to adjacent the TV 205. The virtual audio sources 300, 306, 307 now have more of the space between them and the user 201/headphones 200 and therefore the area of the space over which the user 201 may be presented with the modified audio content is increased. In one or more examples, the positioning/movement of the virtual audio sources 300-307 may be configured to affect the direction from which the audio content is perceived but may not affect the perceived distance to the virtual audio source (because the distance may be ignored by the spatial audio presentation in one or more examples). However, the movement of the virtual audio sources 300-307 may provide the user 201 with an intuitive way of controlling within how much of the room or space the presence of the real-world object will cause the presentation of the modified audio content (when it intersects the aforementioned line or is within the respective region 400).

In one or more examples, the user interface provided by the apparatus 101 may be configured to provide for individual movement of the virtual audio sources or movement of groups of virtual audio sources.

Figure 5:
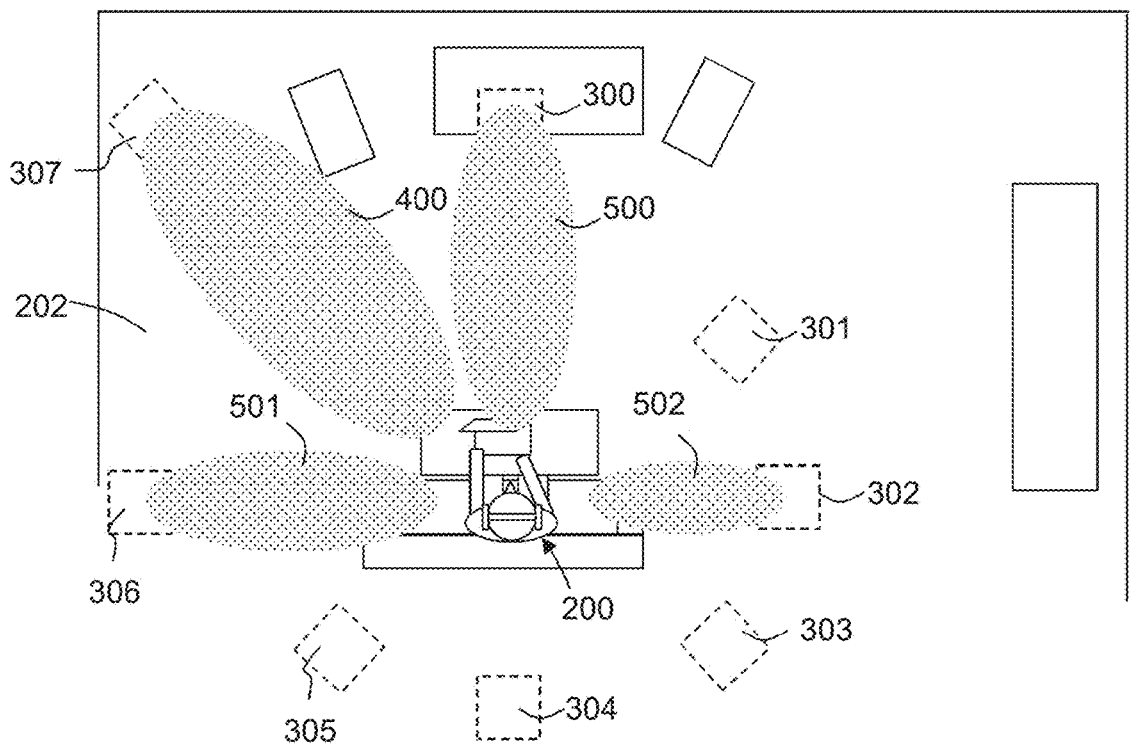
FIG. 5 shows the example space of FIG. 4 and example regions between the headphones and the one or more virtual audio sources in which the presence of the real-world object will cause the modification of the audio content.

With reference to example FIG. 5, several regions 400, 500, 501, 502 are shown which define an area or volume (shown in plan view) in which the presence of the real-world object will cause the modification of the audio content and presentation of the modified audio content. The movement of the virtual audio sources 300, 306, 307 has resulted in the regions 400, 500, 501 covering a greater area or volume of the space 202 than previously. Thus, in one or more examples, the size of the region 400, 500, 501 is based on both a line connecting the reference location and the location of the or each virtual audio source and the distance between the respective virtual audio source and the reference location.

Figure 6:
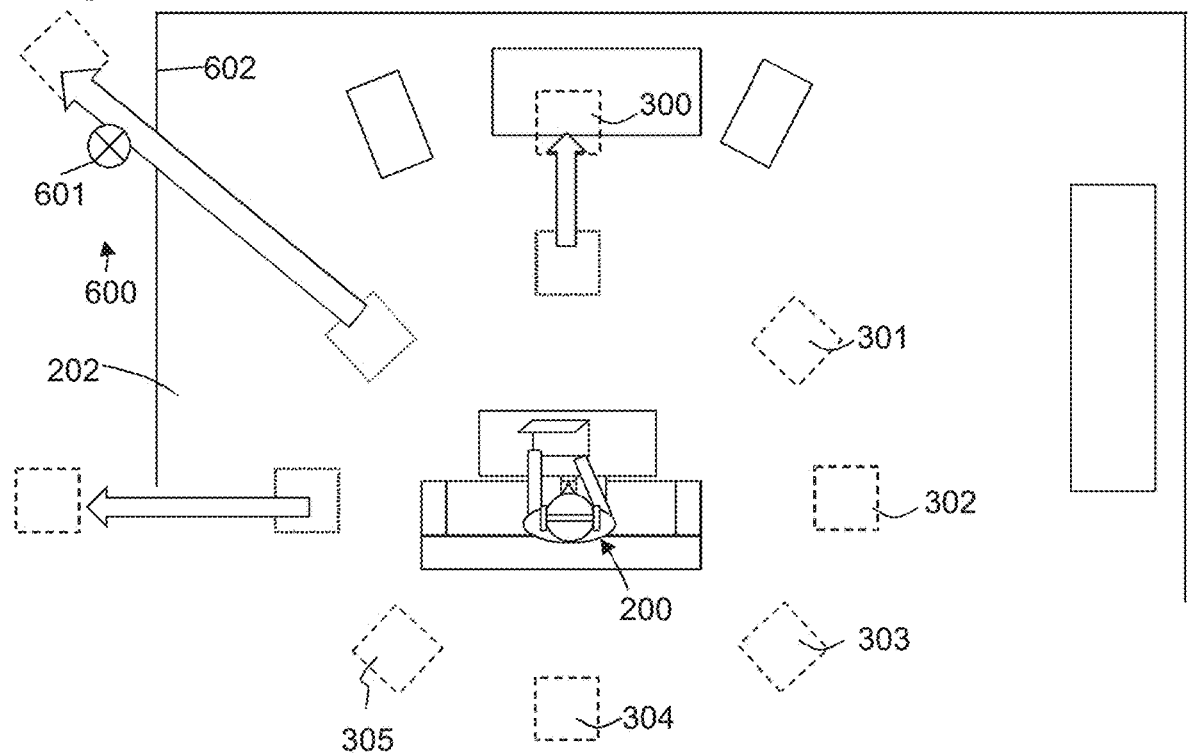
FIG. 6 shows the example space wherein the location of one or more of the virtual audio sources is positioned beyond a physical boundary of the space in which the headphones and user are located.

Example FIG. 6 shows the positioning of one or more of the virtual audio sources beyond a physical barrier, such as a wall, window or partition. Provided that the second information is configured to be indicative of the presence (or absence) of real world objects beyond the physical barrier, the user 201 may now be informed, by the aforementioned modification and presentation of the modified audio content from selected virtual audio sources, of the presence and location of real-world objects beyond the room they are in.

Thus, in one or more examples, the virtual audio sources are positioned or positionable beyond walls of a room in which the user 201 is located and the second information is indicative of the presence or absence of a real-world object at least between the reference location and the location of the or each virtual audio source both in the room the user is located and at least a region 600 outside the room 202 in which the user 201 is located. Further, the apparatus 101 may be configured to, based on one or more of the virtual audio sources having a location beyond a physical structure, such as a wall, and the second information being indicative of the presence of a real-world object at least between the reference location and the location of the or each virtual audio source that is beyond the physical structure provide for modification of the audio content and presentation of the modified audio content.

Figure 7:
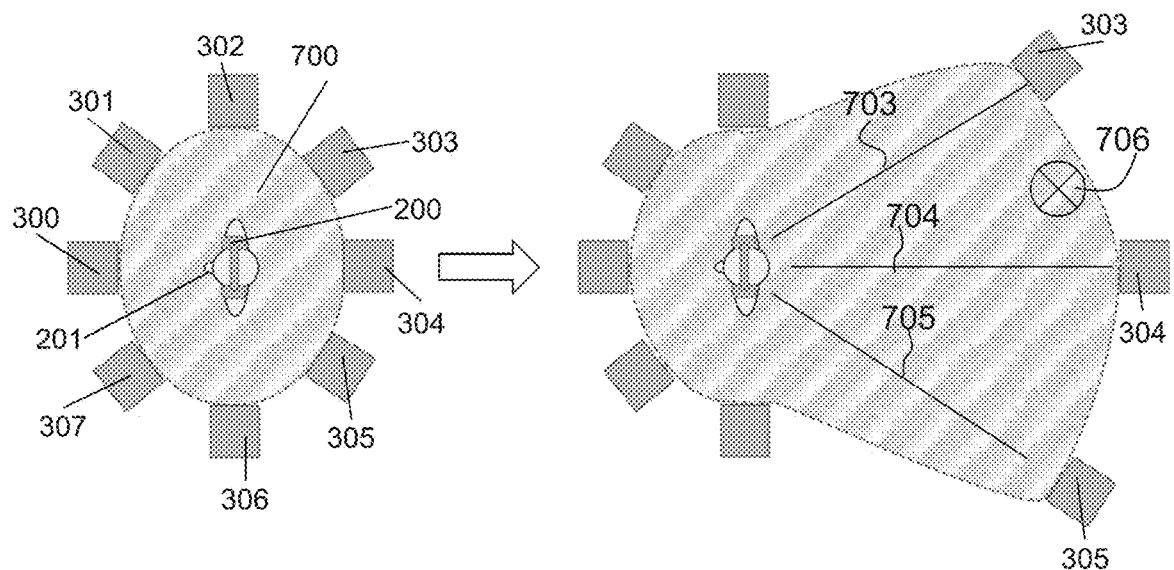
FIG. 7 shows an example of providing for presentation of the modified audio content based on object in an area determined by the arrangement of virtual audio sources.

Example FIG. 7 shows the user 201 wearing the headphones 200 surrounded by the virtual audio sources from which they perceive the audio content by virtue of its presentation as spatial audio. In one or more examples, the second information may be indicative of the presence or absence of a real-world object in a collective region 700 and between the reference location and the virtual location of the or each virtual audio source. The collective region may have a perimeter that extends between adjacent virtual audio sources 300-307 and may include the location of the headphones 200/user 201. The apparatus 101 may be configured to provide for presentation of the modified audio content based on a real-world object being with the collective region 700. The selection of the virtual audio sources from which the modified audio content is to be perceived may be based on the closest one or closest two virtual audio sources to the location of the real-world object. The degree to which to modify the audio content may be based on the distance of the real-world object from the connecting line between the reference location and each respective virtual audio source 300-307. Thus, as the real-world object moves to a position directly between the reference location and each respective virtual audio source 300-307, the audio content is modified to a higher degree than when the real-world object is in a position not directly between the reference location and the virtual audio source.

On the right-hand side of FIG. 7, it can be seen that the virtual audio sources 303, 304, 305 to the rear of the user 201 have been positioned further from the user 201 than the others. The distance between the connecting lines 703, 704 and 705 of virtual audio sources 303, 304 and 305 respectively is greater than when the virtual audio sources 303, 304 and 305 are nearer to the user 201/headphones 200. Thus, based on a real-world object 706 being between the virtual audio sources 303, 304, the audio content may be modified to a lesser degree to the audio content perceived from the virtual audio sources 303 and 304.

Thus, in one or more examples, the number of virtual audio sources is user controllable based on user input. Accordingly, the apparatus 101 may be configured to provide a user interface to receive user input to control the number of virtual audio sources, the apparatus configured to provide for spatial audio presentation of the audio content, as described above, from the user selected number of virtual audio sources.

The addition of virtual audio sources may provide for presentation of the modified audio content from a greater granularity of directions (i.e. directions along which the virtual audio sources lie) allowing the user 201 to perceive the location of the real-world object 706 more precisely. The removal of virtual audio sources may provide the user with a more spatially separate audio scene with different audio content perceived from directions spaced from the directions other audio content is perceived.

Figure 8A:
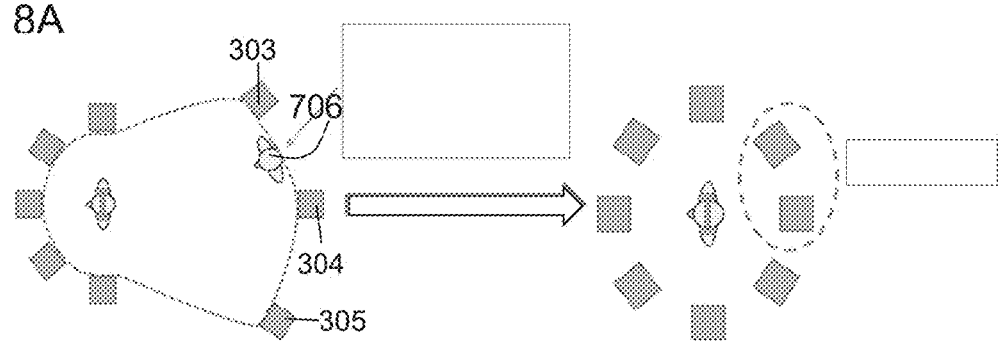
FIGS. 8A and 8B shows an example of the effect of adding additional audio sources.
Figure 8B:
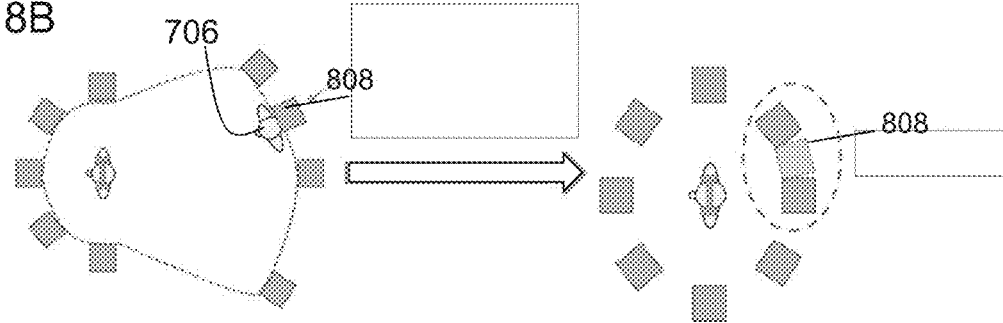

Example FIG. 8A shows a similar arrangement to that shown in FIG. 7. Example FIG. 8B shows an additional virtual audio source 808 has been added having a location between the virtual audio sources 303 and 304. Accordingly, the presence of the real-world object 706 between the audio sources 303 and 304 will now be located between the additional virtual audio source 808 and the user 201/headphones 200. Accordingly, the audio content may be modified to a higher degree that is to be provided for presentation such that it is perceived from the location of virtual audio source 808 relative to the modification for the audio content to be perceived from the other virtual audio sources. Thus, the addition of virtual audio sources may provide for better understanding of where real-world objects are located.

In one or more examples, the modification of the audio content or the degree to which the audio content is modified may be based on the type of real-world object. For example, the user 201 may wish that the audio content is modified to a higher degree if the real-world object is their child, but perhaps to a lesser degree if the real-world object is their partner.

Thus, in one or more examples, the second information is further indicative of the real-world object being one of a first predetermined classification and a second predetermined classification. It will be appreciated that there may be more than two classifications. Further, the modification of the audio content may comprise a first audio modification for real-world objects of the first predetermined classification and a second, different, audio modification for real-world objects of the second predetermined classification. The first and second audio modifications may comprise the same effect applied at different levels to provide an audible distinction.

The first and second predetermined classifications may be based on one or more of the physical size of the real-world object; the current speed of movement of the real-world object; and the real-world object comprising a child or an adult. Thus, real world objects having less than a predetermined size may be classified as the first predetermined classification and real-world objects greater than or equal to the predetermined size may be classified as the second predetermined classification. In another example, real world objects that are currently moving slower than a predetermined speed may be classified as the first predetermined classification and real-world objects that are currently moving faster than or equal to the predetermined speed may be classified as the second predetermined classification. The predetermined speed and predetermined size may be based on user input. Further, the classification of the real-world objects may, in one or more examples, be based on a user-specified criterion.

The size and speed of the real-world objects may be determined from sensor data, such as information from the tracker 102. In other examples, visual recognition algorithms may be used to identify real world objects to provide for their classification. In one or more examples, a neural network may be used to identify and/or classify real-world objects.

In one or more examples, the audio content includes live audio captured from the space 202 in which the headphones are located. Thus, a microphone or microphone array may be present in the space 202 and the audio captured by the microphone or array may be presented, by the apparatus 101 or under the control of the apparatus 101, to the user 201 using the headphones 200. The direction from which the audio was captured may be reproduced in the spatial audio presentation of said captured audio.

In the examples described herein the location of the one or more virtual audio sources are defined relative to the space 202 within which the user 201 is located when said user consumes said presented audio content. Thus, the location of the one or more virtual audio sources are considered "world-locked" and the audio content may be considered 6DoF content. In one or more examples, however, the location of the one or more virtual audio sources are defined relative to the user or their body and are therefore "user locked" and the audio content may be considered 3DoF content.

Figure 9:
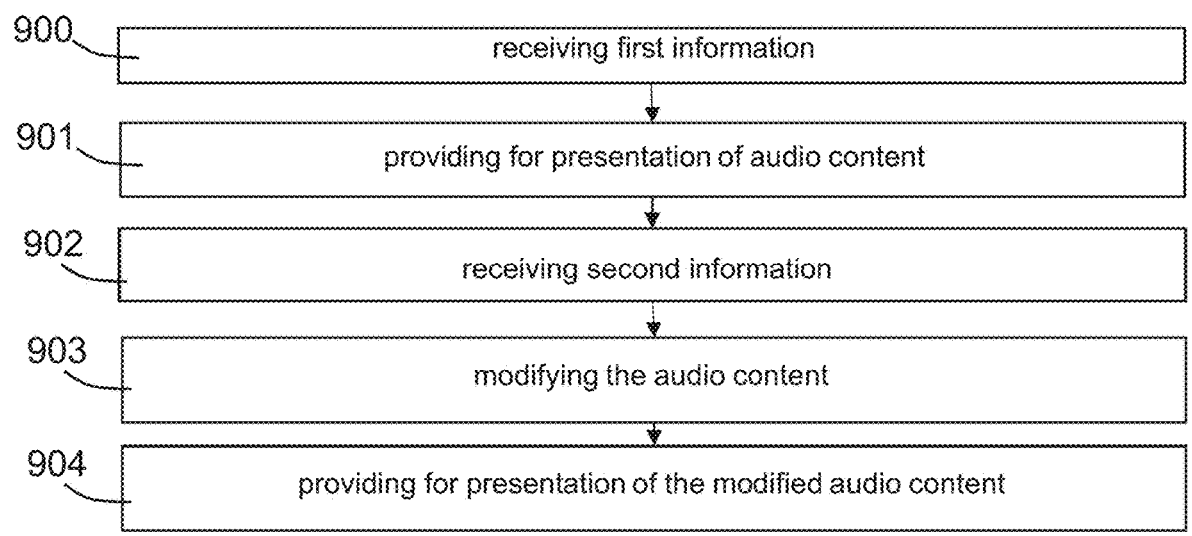
FIG. 9 shows a flowchart illustrating an example method.

FIG. 9 shows a flow diagram illustrating the steps of, receiving 900 first information indicative of a reference location;

providing for presentation of audio content 901 as spatial audio to be perceived, from the reference location, as originating from a direction of at least one virtual audio source, the at least one virtual audio source associated with a real-world location;

receiving second information 902 indicative of at least the presence of a real-world object between the real-world location of the at least one virtual audio source and the reference location;

modifying 903, based on the second information, the audio content to indicate aurally the location of the real-world object; and providing for presentation of the modified audio content as spatial audio 904.

Figure 10:
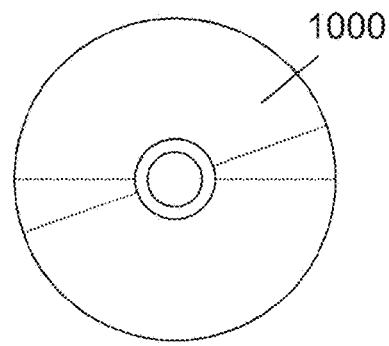
FIG. 10 shows a computer readable medium.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory including computer program code,
the at least one memory and the computer program code configured to, with the at least one processor, cause the apparatus to perform at least the following:
receive first information indicative of a reference location, wherein the reference location is a real-world reference location determined at least in part by a location tracker;
provide for presentation of audio content as spatial audio to be perceived, from the reference location, as originating from a direction of at least one of a plurality of virtual audio sources, the plurality of the virtual audio sources associated with respective real-world locations;
receive second information detected by at least the location tracker during real-time or near real-time presentation of the audio content and indicative of at least the presence of a real-world object between any of the real-world locations associated with the respective virtual audio sources and the real-world reference location;
select, based on the second information, those of the plurality of virtual audio sources having the real-world object located between them and the reference location;
modify, based on the second information, the audio content associated with the selected virtual audio sources, to indicate aurally the location of the real-world object, wherein the audio content originating from non-selected virtual audio sources is unmodified; and
provide for presentation of the modified audio content as spatial audio.

2. The apparatus of claim 1, wherein the apparatus is configured to modify the audio content by one or more of:
providing a temporary reduction in volume;
providing for a temporary change in the level of reverberation; or
providing for a temporary change in presentation and maintaining the direction of the at least one of the plurality of virtual audio sources.

3. The apparatus of claim 1, wherein the apparatus is configured to:
receive user-input; and
reposition, based on said user-input, one or more of the at least one of the plurality of virtual audio sources to thereby define a region between the reference location and the one or more virtual audio sources in which the presence of the real-world object will cause the modifying of the audio content.

4. The apparatus of claim 1, wherein the second information is indicative of at least the presence or absence of a real-world object within a predetermined distance of a line connecting the location of each of the plurality of virtual audio sources and the reference location.

5. The apparatus of claim 1, wherein a number of the plurality of virtual audio sources is user controllable based on user input.

6. The apparatus of claim 1, wherein the modification of the audio content comprises the apparatus being configured to apply an audio modifying effect to the presentation of the audio content to provide said modified audio content.

7. The apparatus of claim 1, wherein apparatus is configured to provide for positioning of the location of the at least one of the plurality of virtual audio sources beyond walls of a room in which the reference location is located and the second information is indicative of the presence or absence of a real-world object between the reference location and the location of the at least one of the plurality of virtual audio sources.

8. The apparatus of claim 1, wherein the second information is further indicative of the real-world object being one of a first predetermined classification and a second predetermined classification, and wherein the modification of the audio content comprises a first audio modification for real-world objects of the first predetermined classification and a second, different, audio modification for real-world objects of the second predetermined classification.

9. The apparatus of claim 8, wherein the first and second predetermined classifications are based on one or more of:
the physical size of the real-world object;
the current speed of movement of the real-world object;
the real-world object comprising a child or an adult; or
a user-specified criterion.

10. The apparatus of claim 1, wherein presentation as spatial audio is based on the direction of the virtual audio source relative to reference location and is independent of the distance between the virtual audio source and the reference location.

11. The apparatus of claim 1, wherein the audio content comprises at least a first audio content and a second audio content, the first and second audio content comprising different audio content, and
wherein the apparatus is configured to provide for presentation of the first audio content to be perceived as originating from a first subset of the plurality of the virtual audio sources and to provide for presentation of the second audio content to be perceived as originating from a second, different subset of the plurality of the virtual audio sources.

12. The apparatus of claim 1, wherein the apparatus is configured to assign the location of the at least one of a plurality of virtual audio sources relative to a space within which the user is located when said user consumes said presented audio content.

13. A method comprising:
receiving first information indicative of a reference location, wherein the reference location is a real-world reference location determined at least in part by a location tracker;
providing for presentation of audio content as spatial audio to be perceived, from the reference location, as originating from a direction of at least one of a plurality of virtual audio sources, the plurality of the virtual audio sources associated with respective real-world locations;
receiving second information detected by at least the location tracker during the real-time or near real-time presentation of the audio content and indicative of at least the presence of a real-world object between any of the real-world locations associated with the respective virtual audio sources and the real-world reference location;
selecting, based on the second information, those of the plurality of virtual audio sources having the real-world object located between them and the reference location;
modifying, based on the second information, the audio content associated with the selected virtual audio sources, to indicate aurally the location of the real-world object wherein the audio content of non-selected virtual audio sources is unmodified; and
providing for presentation of the modified audio content as spatial audio.

14. The method of claim 13, wherein the audio content is modified by one or more of:
providing a temporary reduction in volume;
providing for a temporary change in the level of reverberation; or
providing for a temporary change in presentation and maintaining the direction of the at least one of the plurality of virtual audio sources.

15. The method of claim 13 further comprising:
receive user-input; and
reposition, based on said user-input, one or more of the at least one of the plurality of virtual audio sources to thereby define a region between the reference location and the one or more virtual audio sources in which the presence of the real-world object will cause the modifying of the audio content.

16. The method of claim 13, wherein the second information is indicative of at least the presence or absence of a real-world object within a predetermined distance of a line connecting the location of each of the plurality of virtual audio sources and the reference location.

17. The method of claim 13, wherein a number of the plurality of virtual audio sources is user controllable based on user input.

18. A non-transitory computer readable medium comprising program instructions stored thereon for performing at least the following:
receiving first information indicative of a reference location, wherein the reference location is a real-world reference location determined at least in part by a location tracker;
providing for presentation of audio content as spatial audio to be perceived, from the reference location, as originating from a direction of at least one of a plurality of virtual audio sources, the plurality of one virtual audio sources associated with respective real-world locations;
receiving second information detected by at least the location tracker during real-time or near real-time presentation of the audio content and indicative of at least the presence of a real-world object between any of the real-world locations associated with the respective virtual audio sources and the real-world reference location;
selecting, based on the second information, those of the plurality of virtual audio sources having the real-world object located between them and the reference location;
modifying, based on the second information, the audio content associated with the selected virtual audio sources, to indicate aurally the location of the real-world object, wherein the audio content originating from non-selected virtual audio sources is unmodified; and
providing for presentation of the modified audio content as spatial audio.

* * * * *

UNITED STATES PATENT AND TRADEMARK OFFICE
CERTIFICATE OF CORRECTION

Page 1 of 1

PATENT NO.         : 10,993,066 B2
APPLICATION NO.    : 16/438687
DATED              : April 27, 2021
INVENTOR(S)        : Laaksonen et al.

It is certified that error appears in the above-identified patent and that said Letters Patent is hereby corrected as shown below:

In the Claims

Column 22,
Line 42, "the plurality of one virtual" should read --the plurality of virtual--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*